(12) United States Patent
Muirbrook

(10) Patent No.: US 9,031,868 B2
(45) Date of Patent: May 12, 2015

(54) PAYMENT PROCESSING METHODS

(75) Inventor: Carl T Muirbrook, Turlock, CA (US)

(73) Assignee: Locomobi, Inc., Menlo Park, CA (US)

( * ) Notice: Subject to any disclaimer, the term of this patent is extended or adjusted under 35 U.S.C. 154(b) by 468 days.

(21) Appl. No.: 13/066,359

(22) Filed: Apr. 12, 2011

(65) Prior Publication Data

US 2011/0258076 A1 Oct. 20, 2011

Related U.S. Application Data

(60) Provisional application No. 61/342,328, filed on Apr. 13, 2010.

(51) Int. Cl.
| | | |
|---|---|---|
| G06Q 30/00 | (2012.01) | |
| G06Q 30/06 | (2012.01) | |
| G06Q 30/02 | (2012.01) | |
| G06Q 20/20 | (2012.01) | |
| G06Q 20/32 | (2012.01) | |
| G07F 17/24 | (2006.01) | |

(52) U.S. Cl.
CPC ........ *G06Q 30/0633* (2013.01); *G06Q 30/0639* (2013.01); *G06Q 2240/00* (2013.01); *G06Q 30/0284* (2013.01); *G06Q 20/20* (2013.01); *G06Q 20/3224* (2013.01); *G06Q 20/3276* (2013.01); *G06Q 30/06* (2013.01); *G06Q 30/0613* (2013.01); *G07F 17/24* (2013.01)

(58) Field of Classification Search
USPC ................................................ 705/26.1–27.2
See application file for complete search history.

(56) References Cited

U.S. PATENT DOCUMENTS

| | | |
|---|---|---|
| RE39,736 E | 7/2007 | Morrill, Jr. |
| 7,539,500 B2 | 5/2009 | Chaing |
| 7,714,742 B1 | 5/2010 | Noworolski |
| 7,805,239 B2 | 9/2010 | Kaplan et al. |
| 7,848,980 B2 | 12/2010 | Carlson |
| 8,004,426 B2 | 8/2011 | Dasgupta |
| 2002/0008639 A1 | 1/2002 | Dee |
| 2002/0023010 A1 | 2/2002 | Rittmaster et al. |
| 2004/0212518 A1* | 10/2004 | Tajima et al. ............ 340/928 |
| 2006/0128397 A1 | 6/2006 | Choti et al. |
| 2007/0203836 A1 | 8/2007 | Dodin |
| 2008/0010190 A1 | 1/2008 | Rackley III et al. |

(Continued)

FOREIGN PATENT DOCUMENTS

| | | | | |
|---|---|---|---|---|
| JP | 2003-296898 | 10/2003 | ............ | G08G 1/14 |
| KR | 10-2004-0070953 | 8/2004 | ............ | H04Q 7/24 |

(Continued)

OTHER PUBLICATIONS

Worthington, S., & Edwards, V. (2000). Changes in payments markets, past, present and future: A comparison between australia and the UK. The International Journal of Bank Marketing, 18(5), 212-221.*

(Continued)

*Primary Examiner* — Resha Desai
(74) *Attorney, Agent, or Firm* — Hayes Soloway P.C.

(57) ABSTRACT

A system and methods using applications for payment of goods and/or services based on verifying whether geographic information received from an electronic device with the app corresponds with geographic information from a registered location. A processing center executes a default action when the geographic information so corresponds, and in one embodiment, the default action is to complete the transaction.

19 Claims, 4 Drawing Sheets

(56) References Cited

U.S. PATENT DOCUMENTS

| | | |
|---|---|---|
| 2008/0010192 A1 | 1/2008 | Rackley III et al. |
| 2008/0010193 A1 | 1/2008 | Rackley III et al. |
| 2008/0059375 A1 | 3/2008 | Abifaker |
| 2008/0167000 A1 | 7/2008 | Wentker et al. |
| 2008/0167017 A1 | 7/2008 | Wentker et al. |
| 2008/0167961 A1 | 7/2008 | Wentker et al. |
| 2009/0066476 A1 | 3/2009 | Raheman |
| 2009/0254479 A1 | 10/2009 | Pharris et al. |
| 2009/0327061 A1 | 12/2009 | Wren |
| 2010/0169212 A1 | 7/2010 | Paintin |
| 2010/0201536 A1 | 8/2010 | Robertson et al. |
| 2010/0274693 A1 | 10/2010 | Bause et al. ............ 705/32 |
| 2011/0060600 A1 | 3/2011 | Fox et al. |
| 2011/0238464 A1 | 9/2011 | Dasgupta ............ 705/13 |
| 2012/0130775 A1* | 5/2012 | Bogaard et al. ............ 705/13 |

FOREIGN PATENT DOCUMENTS

| | | | | |
|---|---|---|---|---|
| KR | 10-2005-0015772 | 2/2005 | ............ | G06F 19/00 |
| KR | 10-2007-0033615 | 3/2007 | | |
| WO | WO0011616 | 3/2000 | ............ | G07B 15/00 |
| WO | WO 2004/070674 | 8/2004 | | |
| WO | WO2005086097 | 9/2005 | ............ | G07B 15/02 |
| WO | WO2009049859 | 4/2009 | | |

OTHER PUBLICATIONS

Australian Patent Examination Report No. 1 issued in related application No. 20112406 4, dated May 21, 2014 (3 pgs).

Australian Patent Examination Report No. 1 issued in related application No. 2012316064, dated Aug. 20, 2014 (4 pgs).

International Search Report and Written Opinion issued in corresponding Patent Appin. Serial No. PCT/US2012/057400 dated Mar. 29, 2013 (13 pgs).

Supplemental European Search Report issued in corresponding application No. 11769472.9, dated Apr. 4, 2014 (3 pgs).

International Preliminary Report on Patentability issued in related application No. PCT/US2012/057400, dated Apr. 10, 2014 (10 pgs).

European Patent Office Communication issued in related European Patent Appln. Serial No. 11 769 472.9-1958 dated Apr. 28, 2014 (6 pgs).

* cited by examiner

US 9,031,868 B2

PAYMENT PROCESSING METHODS

CROSS REFERENCE TO RELATED APPLICATION

This non-provisional application claims the benefit of, and priority to, previously filed U.S. provisional patent application No. 61/342,328 filed Apr. 13, 2010, which is herein incorporated by reference in its entirety.

BACKGROUND OF THE INVENTION

1. Field of the Invention

There is an increasing demand by consumers for convenient systems to obtain and pay for goods and services via internet-connected devices, including mobile telephones, hand-held devices, laptop computers, or other electronic device. Often, these devices use software commonly known as a mobile phone application, or app. An application, or app, is a piece of software that can run on the internet, on a computer, on a phone or other electronic device.

2. Description of the Related Art

Many current payment systems use various mobile phone apps that communicate with an access device to complete transactions with consumers. These payment systems require merchants use payment processing devices at the point of sale to complete transactions. The consumer moves a phone bearing a payment app in front of the access device at the store to complete a transaction. In these systems, each merchant must have a point-of-sale access device to complete transactions with consumers.

Other methods require consumers to carry a card or cards with specific information encoded on the card. Merchants must have a payment processing device at the point of sale to complete transactions with consumer using encoded cards.

BRIEF SUMMARY OF THE INVENTION

Embodiments of the invention allow merchants to complete transactions with consumers, without requiring a point-of-sale access device. The consumer may purchase items using a mobile telephone or other internet-connected device. Merchants do not need payment processing or access devices to conduct transactions with consumers because there is no need for a device at the point of sale.

Embodiments of the invention conduct transactions based on geographic location. This may be determined as longitude and latitude, and may be entered using global positioning systems technology. A specific physical place of business may be entered as a registered location 10 within the system. When a consumer wishes to make purchases at a registered location, the consumer may download an embodiment of the invention to an internet-connected device. The consumer may set consumer parameters linked to each registered location. These consumer parameters may include identifying information, maximum amount of purchase, and payment options.

In some embodiments, when a consumer with a mobile phone containing the app wishes to make a purchase at a registered location, the consumer launches the app. Upon launch, the app communicates the specific physical location of the mobile phone via the internet to a remote server. The app simultaneously communicates specified consumer parameters to the remote server. The server is part of the remote processing center. The server analyzes the geographic information received from the mobile phone. When the geographic information transmitted from the mobile phone corresponds to geographic information of a registered location, the processing center executes a default action.

In some embodiments, the default action is to complete a transaction with no additional input from either the consumer or the merchant. The default action executes upon launch of the app.

In some embodiments, based on the physical location of the electronic device with the app, the default action is to activate a camera connected with the electronic device. The electronic device bearing a camera is placed in front of registered readable location information, and the remote server may complete the transaction.

Embodiments of the invention allow the consumer to enter different consumer parameters that apply at different registered locations.

Embodiments of the invention may eliminate the need for on-site workers, and eliminate the need for a payment processing or access device. In some embodiments, the app may be launched at a specific registered parking facility. In some embodiments, the consumer can use the invention to determine parking space availability, to locate parking, to reserve a parking space in a designated parking facility, to lift parking facility gate arms, and to pay for parking.

In other embodiments, the system can also be used to complete other consumer transactions, such as ordering foods, beverages, clothing, fuel or other goods or services. In addition, the system may be used to remotely pay for other goods, services, fees or admissions. Embodiments of the invention allow consumers to make repeated purchases at the same places, upon launch of the app. For example, people may engage in a routine where they frequent the same facilities; routinely parking in the same facility, or buying gas at the same gas station, or purchasing food or drink at the same market, café or store.

These and other embodiments of the invention are described in further detail below.

DESCRIPTION OF THE SEVERAL VIEWS

DETAILED DESCRIPTION OF THE INVENTION

Figure 1:
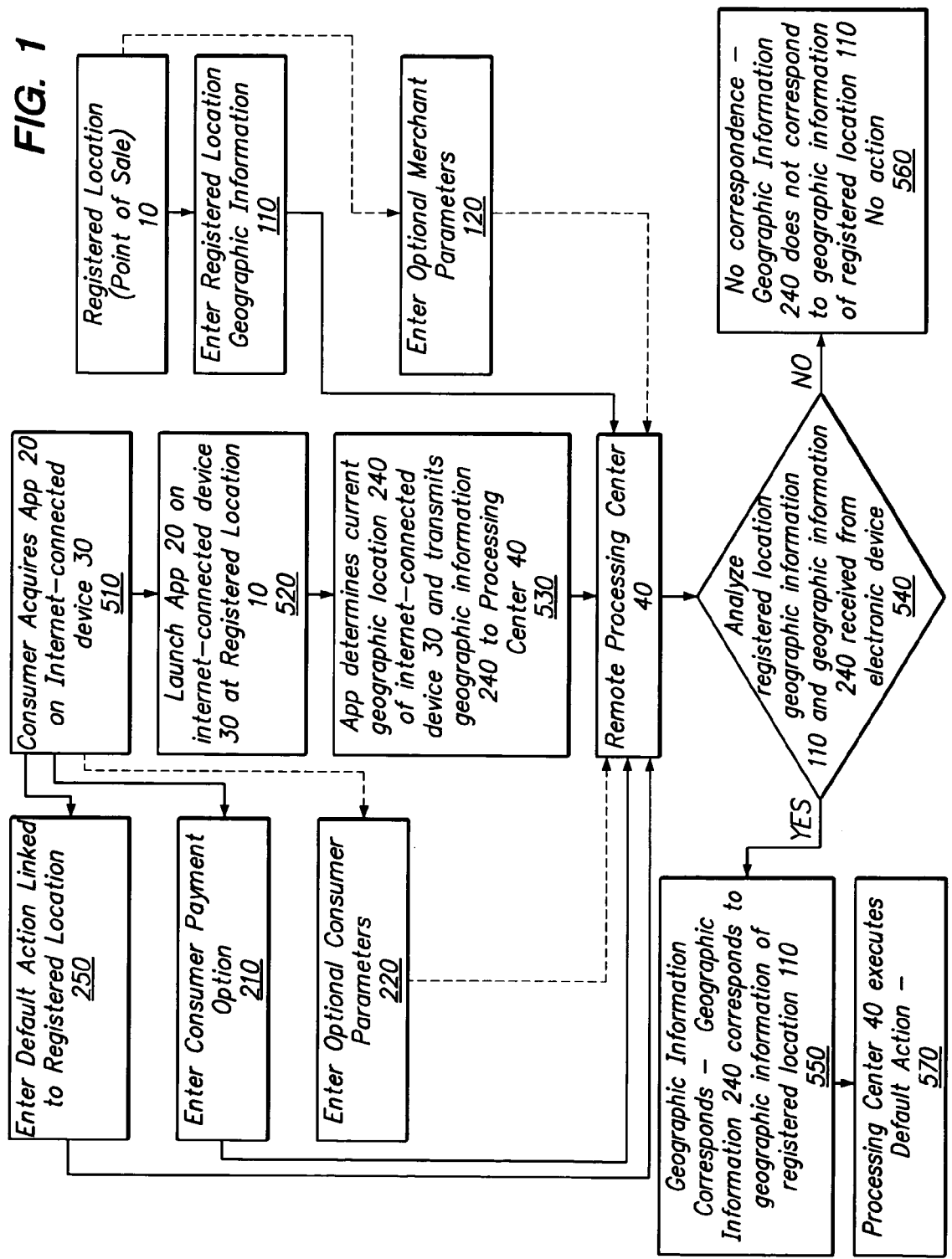
FIG. 1 is a flow diagram of embodiments of the invention when a registered location is a point of sale.
Figure 2:
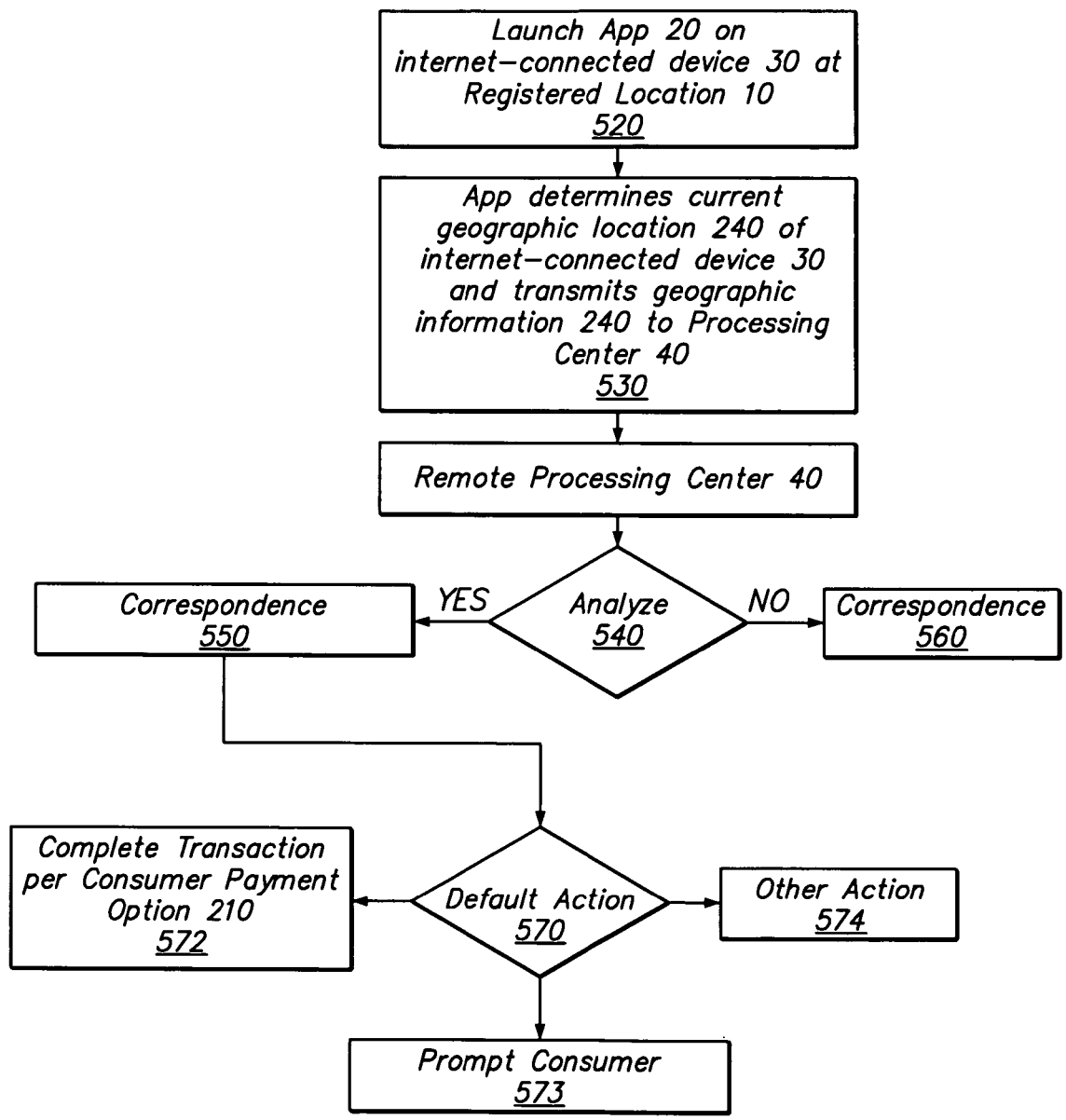
FIG. 2 is a flow diagram of embodiments of the system executing different default actions.
Figure 3:
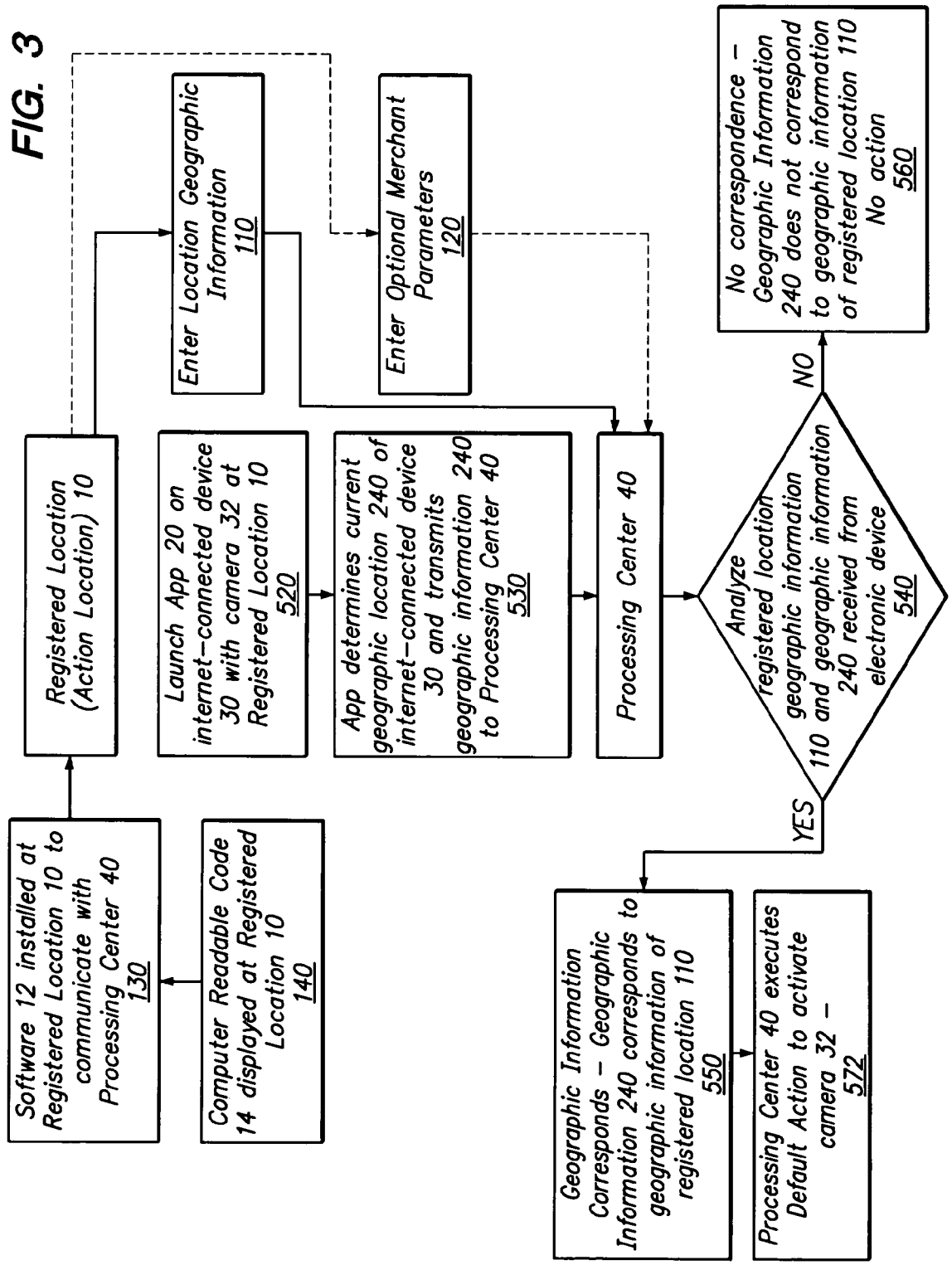
FIG. 3 is a flow diagram of embodiments of the invention when a registered location is an action location.
Figure 4:
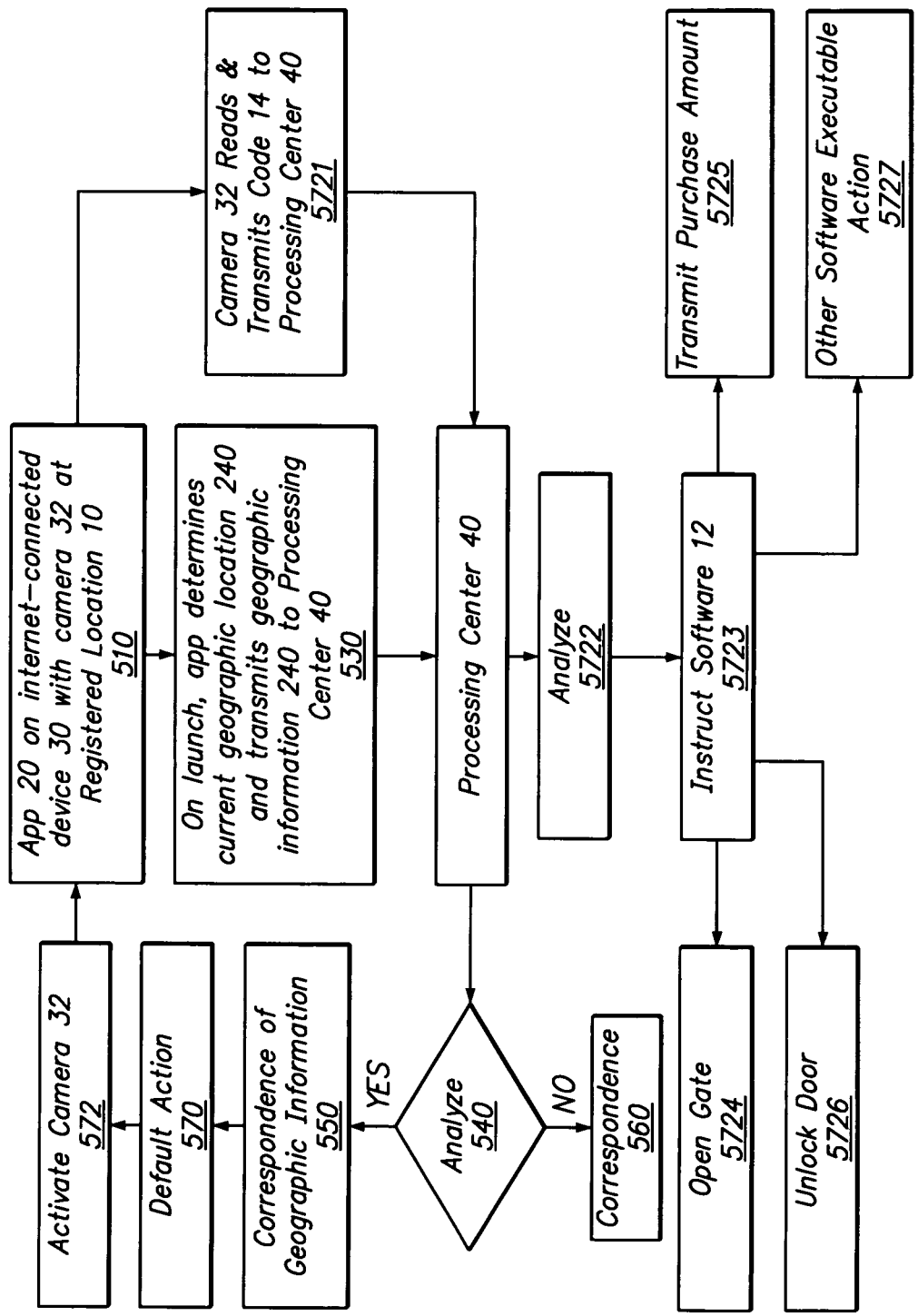
FIG. 4 is a flow diagram of embodiments of system analysis and action when the default action activates a camera.

As used in this specification, electronic device and internet-connected device are used interchangeably and mean the same thing. Non-limiting examples of these devices are mobile phones, hand-held devices, computers and other devices that can receive and transmit information via the internet, either wirelessly or through wires.

Embodiments of the invention include an application that is accessible through electronic devices 30. When a consumer launches the app at a registered location 10, the app transmits the physical location of the electronic device to a remote server. Based on the location information, the server executes a default action 570. In some embodiments, the default action is to complete the transaction 572. In these embodiments, the default action executes upon launch of the app.

In some embodiments, the physical location of a place of business 110 is registered with the system. This registration process can occur in any number of ways. As non-limiting examples, the merchant or system operator may register information with the system.

Registration requires entry of specific data into the processing center, including entry of geographic information linked to a specific location 110. A registered location 10 may be a point of sale, or may be an action location. Merchant geographic information 110 is any data that identifies the unique physical location of a registered location 10, and may include latitude and longitude data generated from global positioning technology. The system allows for numerous registered locations, for a plurality of businesses. The system also allows for a plurality of registered locations at a single place of business, as non-limiting examples, multiple unique cash registers at a single store, or registered locations for different types of sales at a single cash register.

Registration may also include entry of other merchant parameters 120, as needed. A merchant parameter 120 may include the type of business, a maximum transaction amount, or any other variable, information or parameters that may be desired.

Once specific geographic information 110 is entered with the system, and a registered location 10 is created, consumers may use embodiments of the invention to pay for goods or services at that registered location by executing the app.

The consumer may acquire the app in any way. As non-limiting examples, a consumer may acquire the app 510 by downloading the app to a mobile phone or to any other internet-connected device, or may acquire the app through CDs, or any other way to transfer software.

Once a consumer has acquired the app 510, the consumer enters at least one payment option 210 and default action 570. A payment option 210 may include any payment method. As non-limiting examples, the consumer may enter a specific credit or debit card to pay for transaction, bank account, online payment option, or the use of checks, or other payment account. In instances where a consumer uses the system to order goods and services from a business that is remote from the consumer's current location, the consumer may also enter a payment option of cash. In this instance, when the consumer arrives at the (previously remote) physical location, the consumer may pay cash upon delivery of the goods or services.

In addition, the consumer may enter various other consumer parameters 220, as needed or desired. As non-limiting examples, consumer parameters may be consumer identification information, approved registered locations, a maximum purchase amount, a unique payment option linked to a specific registered business, and any other information, variable or parameter that may be desired. In some embodiments, the app will prompt the consumer for this information.

These consumer parameters may be specific to each registered location 10. That is, each consumer may set different parameters for different businesses or locations. As non-limiting examples, a consumer may enter a first payment option linked to specified registered locations, and a second payment option linked to other registered locations; the consumer may allow a maximum purchase amount at a specific location, or may limit the days that payments may be processed at a specific registered location.

After the consumer parameters are entered into the system, the consumer may purchase goods or services upon launch of the app 520. In these embodiments, a consumer arrives at a registered location to make a purchase. To complete the transaction, the consumer only has to launch the app. No further input or entry is needed by the consumer, and no further input or entry is needed by the merchant. Launching the app completes the transaction.

Upon launch 520, the app transmits to the processing center 40 the current geographic location of the mobile device 240 using global positioning systems technology 530 that is known to those skilled in the art, as a non-limiting example GPS. The app may simultaneously transmit any other consumer parameter.

In some embodiments, the app transmits the location 240 and consumer parameters 220, if any, wirelessly to remote communication devices, including orbiting satellites, communication towers, and other equipment used for wireless communications. These remote communication devices are not at the point of sale or action location; they are remote from the registered location.

Thus, the consumer geographic information 240 and parameters 220, if any, are transmitted via the wireless internet from the internet-connected device to the remote processing center 530.

In other embodiments, the app 20 communicates the location 240 and consumer parameter 220, if any, via a wired network, to the remote processing center 40.

At the processing center 40, a server analyzes 540 the geographic location information 240 received from the app 20. The processing center analyzes whether the geographic information received from the electronic device with the app corresponds 550 to the geographic location of a registered location. Corresponding geographic information occurs when geographic information received from the electronic device is within a set distance of a physical point of sale, and this correspondence distance may be as specific as needed to identify a first point of sale from a second or other points of sale.

If the geographic information corresponds 550, the processing center 40 executes the default action 570 that is linked to the registered location. The consumer enters 250 a default action 570 for each registered location 10. As a non-limiting example, the consumer may enter a default action to complete the transaction upon launch of the app at a specific registered location 572. The processing center 40 will complete the transaction by charging the consumer according to the payment instructions 210 supplied by the consumer. If the geographic information does not correspond 560, no action is taken.

The consumer may enter a different default action for each registered location.

In other instances, the default action may transmit questions or prompts 573 back to the consumer's electronic device. In these instances, upon launch, the electronic device transmits the geographic location 240 of the electronic device 30 with the app 20 to the remote processing center 40. The processing center analyzes 540 whether geographic information received from the electronic device corresponds with geographic information of a registered location. When the processing center verifies that the geographic information corresponds, the processing center's default action may be to transmit questions or prompts 573 back to the electronic device.

As non-limiting examples, the center may ask the consumer to enter an amount of payment, confirm a payment amount, confirm the physical location, confirm identifying information, or any other prompt or question that is needed or wanted. If all information is correct, the server at the processing center will complete the transaction by charging the consumer according to the payment option 210 supplied by the consumer.

The default action may be any other action, where the processing center can effect action 574.

The processing center completes the transaction between the consumer and the registered location using technology and methods known to those skilled in the art. As a non-limiting example, the processing center may use a third party for the debit/credit or other payment transactions.

In some embodiments, after completing the transaction, the processing center will communicate confirmation of the transaction. This confirmation may be communicated by email, text message, mail, or any other method of communication. The confirmation may be sent to the consumer, to the merchant or to both. The confirmation may contain different information, as requested by the consumer, or as requested by the merchant.

In some embodiments, the consumer may make purchases at designated locations that are remote from the consumer's current location. In these embodiments, the consumer may launch the app at a first geographic location. The app will send consumer geographic information and/or consumer parameters to the remote processing center. In these embodiments, the consumer information includes a request to purchase goods or services at a second geographic location, where that second location is a registered location that is remote from the first geographic location. In these embodiments, the consumer payment options include payment of cash upon arrival at the second location to pick up the purchases.

In some embodiments, the merchant may have a display of registered readable code 14. Readable code is entered with the processing center by entering unique geographic location information 110 and linking that geographic information to a specific location 10. In these embodiments, a registered location 10 has software 12 that communicates with the processing center 40, and each registered location 10 is connected with the display of unique readable code 14. As a non-limiting example, a single cash register may be a registered location 10 when the cash register has software 12 that communicates with the processing center 40, and when that cash register is connected with sticker or emblem displaying unique readable code 14.

The readable geographic information may be displayed in either tangible or intangible form. Non-limiting examples of tangible display include bar codes, QR codes, or near field communication tags, stickers or paper. For example, the coded information may be displayed on a sticker that is stuck on or connected with a cash register.

Non-limiting examples of intangible display include display on screens, or RFID. It is apparent that any means for displaying coded information may be used.

The readable code 14 is entered with the system using techniques known by those skilled in the art to link coded information with tangible or intangible media. The code 14 contains geographic data 110 linked to a specific location, and this data is entered in the server at the processing center 40.

The readable code may include the geographic location of a point of sale or other action location. This geographic location information may be as specific as an individual cash register within a single physical location. The readable code 14 may include any other merchant information or parameter that is desired.

When a point of sale has registered readable code, a consumer may use embodiments of the invention to pay for goods or services. The consumer launches the app on an electronic device 30 with a camera 32. Upon launch, the app transmits via the internet 530 the geographic location of the electronic device 240 to the remote processing center 40. When the consumer's geographic information corresponds 550 to a registered location 10 with registered readable code 14, the processing center 40 executes a default action 570.

The default action may be to activate the camera 32 on the consumer's electronic device, so that the camera reads the registered readable code, and transmits that code 5721 to the processing center 40.

The processing center 40 activates the camera 32 by transmitting, via the internet, instructions 572 to the electronic device to activate the camera. The consumer places the activated camera in front of the registered readable code. The camera reads the registered readable information, and transmits this information from the camera to the remote processing center 5721. Upon receipt and analysis of this transmission, the processing center transmits a signal to software 12 linked to that specific registered readable code 14.

Software 12 in each registered action location is capable of communicating with the remote processing center, and of receiving signals from the remote server. Software 12 receives instructions from the processing center 40, and executes an action. Non-limiting examples of such an executable action are opening a gate 5724, unlocking a door 5726, transmitting purchase amounts 5725, or any other software executable action 5727.

In some embodiments, software 12 is linked with readable code 14 at a cash register. After readable code is transmitted from the camera 5721, the processing center 40 instructs the software 12 linked with a registered cash register. The processing center 40 may instruct the software 12 to transmit the purchase amount to the processing center 5725. In some embodiments, depending on consumer preferences, the transaction may be complete at that time. In this embodiment, the consumer enters preferences to complete the transaction when the server receives the purchase amount. In other instances, the consumer may prefer to have final approval of the purchase amount. In these instances, the consumer preferences may require that processing center transmit the purchase amount to the consumer's electronic device. The electronic device displays the purchase price and prompts the consumer to accept or reject the purchase price. The transaction is completed only when the consumer authorizes the purchase. Upon receiving consumer authorization, the processing center will complete the transaction, according to the consumer's payment options and instructions.

A non-limiting example of use of some embodiments of invention is use at parking facilities. The geographic location of a parking facility may be entered into the system 110, creating a registered location 10. Registration can occur in any number of ways, including data entry via a mobile phone, computer or other internet-connected device, whether wired or wireless.

Other information 120 regarding the parking facility may also be included in the registration information, and may include the business name and the street location of the entrance.

After a parking facility is registered, the merchant may access the system through the internet, and enter or change the parking rate structure for each registered parking facility.

Once a parking facility is registered in the system, it is immediately possible to begin using the system to collect parking facility fees. There is no need for any additional hardware or workers to operate the system.

In some embodiments, the system includes a mobile phone application 20 that is capable of being acquired by one or more consumers. The consumer launches the application 520 and uses it to pay for parking at a registered parking lot.

In these embodiments, the application may prompt the consumer to enter information about the consumer 220. As non-limiting examples, consumer parameters may include a vehicle license plate number, vehicle make and model, or the name and address of the consumer. The consumer information may be varied, as desired. As non-limiting examples, the consumer may have more than one vehicle, and each vehicle may be entered. In other situations, the consumer may have a rental car, or be a passenger in someone else's vehicle. In any of these situations, the system allows the consumer to enter the information regarding the specific vehicle that is being parked in a registered parking facility.

The consumer enters at least one payment option 210. As non-limiting examples, a payment option may include a credit card or debit card that will be charged for the consumer's purchases. The consumer also enters at least one default action 250. The consumer enters a specific default action 250 that is linked to a specific registered location 10, and may have different defaults actions 250 for different registered locations 10.

In some embodiments, consumer parameters 210 and 220 may be entered or modified through a mobile phone. In addition, consumer parameters 210 and 220 may be entered or modified through any other internet-connected device.

Once the consumer information is entered, the consumer may immediately use embodiments of the invention to pay for parking at registered locations.

In some embodiments, the system allows a consumer to access information regarding all registered locations within a specified distance. The consumer may set the distance range. As a non-limiting example, the consumer may request the system to locate all registered parking facilities within a specific radius of the consumer's current location. The consumer has the option of modifying the distance range. The invention may then show the consumer all registered facilities that are remote from the consumer's current location, and may show parking availability at each registered location. If the consumer is at a parking facility that is full, some embodiments may allow the consumer to access information regarding nearby registered parking facilities.

In some embodiments, the consumer may review and/or purchase parking at a parking facility that is remote from the consumer. As a non-limiting example, if a consumer arrives at a full parking facility, the consumer may request the system to check the parking availability at registered parking locations that are within a specified distance from the consumer's current location. Upon finding an available parking spot, the system may notify the consumer via the electronic device, and the consumer may then enter information into the electronic device to reserve and/or pay for the remote parking spot.

In another embodiment, where a consumer is planning on driving to a specific location, the consumer may obtain driving instructions, parking facility location and availability prior to leaving, while on route, or at any other time prior to parking.

In one embodiment, the consumer registers a vehicle by entering vehicle identification information into the system. When a registered vehicle is stopped at a registered parking facility, the application will automatically prompt the consumer and request confirmation of payment. This feature only activates when the vehicle, with a consumer and electronic device, are stationary. The consumer will be charged only after arriving and stopping the vehicle at a registered parking facility.

Upon launch of the app, the processing center receives and analyzes geographic information transmitted from the electronic device. If the consumer is at the location of a registered parking facility, the processing center default action may be to complete the transaction. The transaction is completed simply by arriving at a registered parking facility and launching the app.

In other embodiments, the default action may be to prompt the consumer 573, through questions on the screen. Non-limiting examples of such prompts are to confirm that the consumer wishes to park at the specific parking facility, to confirm the identity of the vehicle being parked, and to confirm the parking fee or rate.

In one embodiment the consumer may accept and affirm the parking facility information and payment charge, and the system may immediately process the payment charge. In another embodiment, the system has a time-delay feature. In this embodiment, the consumer may affirm the parking facility and payment charge, and the time-delay embodiment may charge the consumer after a specified period of time before processing the payment charge. The time-delay option will generally be in the range of 5-15 minutes, and allows a consumer to leave the parking facility without paying if the consumer changes his or her mind about parking at that time.

In another embodiment, the consumer may activate the application prior to parking, and select a specific designated facility. After confirming parking space availability, the consumer can pay in advance, and reserve a parking spot prior to actually arriving at the parking facility.

Another embodiment of the invention allows the consumer to reserve a parking space at a specific designated facility for specific periods of time. A consumer may park at a specific parking facility routinely; for example, every day for work. In this embodiment, the consumer can reserve, and pay for, a parking space at a specific designated spot for specific periods of time. Non-limiting examples of periods of time are days, weeks, and months.

In another embodiment, the parking facility merchant may require a specific time to cancel the reservation prior to the reserved time, or the parking charge would be incurred. Thus, the invention allows for flexibility in pricing structure, with the exact terms of the pricing structure to be determined and modified by the parking facility owner.

Another embodiment involves a registered location where the registered location 10 is an action location. An action location is any registered location equipped with software 12 that is capable of communicating with the remote processing center 40, where the software executes an action in response to instructions from the remote processing center.

In some embodiments, a gate or door may be an action location. Gates and doors typically require dedicated equipment to access, open and unlock. Embodiments of the invention may open a gate at a registered location 10, or may unlock a door at a registered location. A location becomes a registered location by entering the geographic information 110 into the system, and installing software 12 connected with the gate or door that communicates with the processing center 40, and displaying computer readable code 14.

The app 20 is launched at a registered gate or door, and transmits 530 the geographic information 240 from the electronic device to the remote processing center 40. The center analyzes 540 the geographic information. When the received geographic information 240 corresponds 550 with a registered location, the default action communicates with software 12 in the registered gate or door, instructing the gate to open, or the door to unlock. This system increases security over conventional gate or door locking systems.

In some embodiments, a registered gate or door may display registered readable code 14, as described in this specification. A non-limiting example of display is a sticker, where the sticker displays computer-readable code 14. A consumer with an electronic device 30 with a camera 32 may launch the app 20 at a registered gate or door. The processing center analyzes 540 the geographic information 240. If the analysis shows that the geographic information 240 corresponds to an action location 10, the processing center 40 activates the camera 572. The camera reads and transmits the readable code 14 to the processing center 5721. The camera 32 reads the code by placing the camera in front of the displayed code.

The processing center analyzes the transmitted code and communicates instructions to the linked software 14. In some embodiments, the instruction is to open the gate 5724. In other embodiments, the instruction is to unlock a door 5726. In some embodiments, the instruction is for other software executable action 5727, such sending an access code to the consumer, allowing the consumer to enter the code and open a gate.

In another embodiment, the application activates only after stopping at a registered location 10.

Upon payment, the system sends a confirmation that appears on the screen of the mobile device. The confirmation is seen by the consumer on the mobile device screen, confirming the amount of payment, and that the payment has been made and received. Alternatively, the consumer may choose to have a receipt sent by email, text message, instant message or any other form of communication.

In some embodiments, the system may provide a real-time log to the parking facility merchant of all registered vehicles parked at a facility. In addition, a confirming message may be sent to each registered parking facility when a vehicle pays for parking using embodiments of the invention. The confirming message will preferably be an email, text message or instant message, but may be any other form of communication, including regular mail. Thus, a registered parking facility will have a record of the transaction. The registered parking facility can use the confirmation message to verify that all vehicles in the parking facility have paid the required fee.

In unattended facilities, merchants periodically send a worker to verify that parked vehicles have paid. In some embodiments of the invention, the worker calls or sends a text message to the processing center. Upon receipt of the transmission from the worker, the processing center will process information regarding parked vehicles, and will transmit a log of vehicle information back to the worker. The worker can use the log to verify and confirm which parked vehicles have paid using the system. In another embodiment, the system may use photos or video to record the license plates of vehicles using the facility. The merchant can verify that all license plates are registered consumers. Thus, the designated parking facility does not need to have any attendant on duty, saving on labor costs.

The confirmation step allows a parking facility merchant to have real-time information regarding parking at the registered parking facility. The invention may provide detailed information to the parking facility owner, including for example, the vehicle make and model, and the time of entering and leaving the facility. The invention may optionally provide other information to the merchant, such as the parking patterns of drivers, and their addresses. Merchants can use this information to target advertising, or to help with parking crowding issues. Merchants can also use this information to optionally provide real-time parking space availability to other drivers through the system.

One embodiment of the invention may include a running log on the consumer's mobile device. The running log shows all transactions made using the system.

The invention may be used in any parking situation. Non-limiting examples are use by cities (or other forms of government) to confirm street parking. In this embodiment, the consumer activates the application, and the application locates the vehicle, and prompts the consumer to confirm parking payment. In one embodiment, the system can verify parking stall number, or read readable code 14.

Other embodiments are an optional feature that reminds a consumer that payment is due; or an optional feature allowing the designated parking facility to bill the consumer directly if the consumer leaves without paying.

In some embodiments, the application prompts a new consumer to enter name, address and payment information. The consumer will launch the application, and the application will prompt the consumer to enter the registered location, the type of food or beverage desired, and the estimated time that the consumer will arrive to pick up the food or beverage. If the consumer does not enter an estimated time, the system will automatically calculate the estimated time to drive from the consumer's current location to the designated location.

In some embodiments, the invention obtains consumer information that, optionally, can be shared with merchants. The information may include parking, eating, fuel or other habits, times and types of purchases, and other demographic information.

The invention described herein can be implemented in the form of control logic using computer software in a modular or integrated manner. Based on the specification, a person of ordinary skill will know and appreciate other methods or systems to implement this invention.

The invention may be embodied in other specific forms without departing from the spirit or essential characteristics thereof. The embodiments disclosed in this specification are to be considered in all respects as illustrative and not restrictive, and all changes that come within the meaning and range of equivalency of the claims are intended to be embraced therein.

One or more features from any embodiment may be combined with one or more features of any other embodiment without departing from the scope of the invention.

As used in this specification, internet-connected device means any device that can connect with the internet, and includes devices that connect wirelessly, or through wires. Non-limiting examples of devices that connect wirelessly to the internet are mobile telephones, hand-held devices, and laptop computers. A non-limiting example of a wired device that connects with the internet is a desktop computer.

The embodiments described herein refer to one mobile phone, consumer, application, merchant and provider. It is understood that there can be more than one mobile phone, consumer, application, merchant or provider.

A recitation of "a" "an" or "the" is intended to mean "one or more" unless specifically indicated to the contrary.

What is claimed is:

1. A method for using an internet-connected device to remotely execute a default action related to a consumer transaction, comprising the following steps:

entering, into a remote processing center comprising a server, information corresponding to at least one registered location, wherein said information comprises a geographic location of a point of sale, and wherein said remote center recognizes said point of sale as a registered location upon entry of geographic information;

downloading a payment application to the internet-connected device, wherein said downloaded payment application prompts a consumer to enter at least one consumer parameter, wherein the consumer sets at least one consumer parameter that is specifically linked to each registered location;

launching said payment application at said registered location, wherein upon launch, said application transmits information via the internet to the remote processing center, and wherein said information comprises the geographic location of the internet-connected device;

verifying, by said remote processing center, that the geographic information received from said internet-connected device corresponds to a registered location; and executing, by the processing center, the default action after said verification step, wherein said default action is individually determined for each registered location, and wherein said default action comprises opening or raising a gate or unlocking a door.

2. The method of claim 1 wherein said geographic information corresponding to a registered location is entered using longitude and latitude.

3. The method of claim 1 wherein two or more registered locations are entered into the processing center.

4. The method of claim 1 wherein a point of sale includes more than one registered location.

5. The method of claim 4 wherein each registered location corresponds to a single cash register.

6. The method of claim 1 wherein said entry of information corresponding to a registered location comprises merchant parameters.

7. The method of claim 6 wherein said merchant parameters are selected from the group consisting of merchant identification information, maximum transaction amount, and cash register identification.

8. The method of claim 1 wherein said default action further comprises completing the payment transaction.

9. The method of claim 1 wherein said default action further comprises prompting the consumer for more input.

10. The method of claim 1 wherein said registered location is a parking facility.

11. The method of claim 1 wherein said at least one consumer parameter includes a consumer payment option.

12. The method of claim 11 wherein said consumer payment option is selected from the group consisting of credit, debit, and cash.

13. A method for using an internet-connected device to remotely execute a default action related to a consumer transaction, comprising the following steps:

entering, into a remote processing center comprising a server, information corresponding to at least one action location, wherein said entered information comprises a geographic location of said action location, wherein said remote processing center recognizes said action location as a registered location upon entry of geographic information, and wherein said registered location has software in communication with said remote processing center;

linking unique readable code with each registered location, wherein said unique readable code is displayed at said registered location;

downloading a payment application to the internet-connected device with a camera, wherein said downloaded payment application prompts a consumer to enter at least one consumer parameter, wherein the consumer sets at least one consumer parameter that is specifically linked to each registered location;

launching said payment application at said registered location, wherein upon launch, said application transmits geographic location information of said internet-connected device via the internet to the remote processing center;

verifying, by said remote processing center, that the geographic information received from said internet-connected device corresponds to a registered location linked with readable code;

executing, by the processing center, a first default action activating said camera after said verification step, wherein said default action comprises opening or raising a gate or unlocking a door;

placing, by the consumer, said activated camera in front of said readable code;

reading, by said activated camera, said readable code;

transmitting said readable code, by said internet-connected device, via the internet to said processing center;

analyzing, by said remote processing center, said readable code received from said camera; and executing, by said processing center, a second default action when said readable code, said geographic information from said internet-connected device and said registered location correspond.

14. The method of claim 13 wherein there is more than one registered location at each action location.

15. The method of claim 13 wherein said unique code is linked to a registered location by tangible media displaying readable code.

16. The method of claim 13 wherein a cash register is a registered location, and said second default action instructs said action location software to transmit a transaction amount to said processing center.

17. The method of claim 13 wherein a gate is a registered location, and said second default action opens said action location software to open said gate.

18. The claim of claim 13, wherein said transmission of information via the internet occurs wirelessly via at least one remote communication device.

19. The method of claim 13, wherein said transmission of information or readable code via the internet occurs wirelessly via at least one remote communication device.

* * * * *